US008054386B2

(12) United States Patent
Kim et al.

(10) Patent No.: US 8,054,386 B2
(45) Date of Patent: Nov. 8, 2011

(54) DISPLAY SYSTEM AND OPERATION METHOD THEREOF

(75) Inventors: Sang-Soo Kim, Seoul (KR); Seung-Woo Lee, Seoul (KR); Bong-Hyun You, Yongin-si (KR); Tae-Sung Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1380 days.

(21) Appl. No.: 11/605,874

(22) Filed: Nov. 28, 2006

(65) Prior Publication Data

US 2007/0120772 A1 May 31, 2007

(30) Foreign Application Priority Data

Nov. 29, 2005 (KR) ........................ 10-2005-0115088
Jun. 27, 2006 (KR) ........................ 10-2006-0058167

(51) Int. Cl.
*H04N 5/44* (2011.01)

(52) U.S. Cl. ........................................ 348/734; 348/553

(58) Field of Classification Search .................. 348/734, 348/552–555, 725, 460, 473, 563–569; 340/825.22, 340/825.25; *H04N 5/44*
See application file for complete search history.

(56) References Cited

U.S. PATENT DOCUMENTS 6,097,441 A * 8/2000 Allport ........................ 348/552
6,407,779 B1 * 6/2002 Herz ............................ 348/734
6,784,804 B1 * 8/2004 Hayes et al. ............... 340/12.23
7,109,974 B2 * 9/2006 Kempisty ...................... 345/173

* cited by examiner

*Primary Examiner* — Trang U Tran
(74) *Attorney, Agent, or Firm* — Innovation Counsel LLP

(57) ABSTRACT

A display system includes a display device and a remote controller. Remote controller makes RF communication with the display device so as to obtain device information and includes a display panel that displays the device information. Remote controller adjusts the device information and sends the adjusted device information to the display device. In the display system, characteristics of the display device are monitored and adjusted by means of remote controller.

23 Claims, 9 Drawing Sheets

200

DISPLAY SYSTEM AND OPERATION METHOD THEREOF

CROSS-REFERENCE TO RELATED APPLICATION

This application relies for priority upon Korean Patent Application Nos. 2005-115088 and 2006-58167 filed on Nov. 29, 2005 and Jun. 27, 2006, the contents of which are herein incorporated by reference.

FIELD OF THE INVENTION

The present invention relates to a display system. More particularly, the present invention relates to a public information display (PID) system.

DESCRIPTION OF THE RELATED ART

A public information display (PID) apparatus may be installed in any public place such as an airport, a waiting room of a rail way station, a concert hall, a hospital, etc. A flat panel display device is extensively used as the PID apparatus because the flat panel display device can be readily installed in a narrow space and can reduce power consumption. The flat panel display device may be an organic light emitting diode (OLED), a liquid crystal display (LCD), a field emission display (FED), a vacuum fluorescent display (VFD), or a plasma display panel (PDP) according to the type of image display panels used.

The front portion of a flat panel display may be provided with OSD (on screen display) control buttons to permit the user to adjust aspects of the image, such as brightness, contrast, horizontal and vertical alignments, and aperture compensation. The flat panel display device used as a public information display may be suspended from the ceiling to provide unobstructed visibility but this prevent the user from easily adjusting the display.

The public information display device is used to provide people with information, so the public information display device must be prevented from malfunctioning and the life span of the public information display device must be controlled. In order to prevent the public information display device from malfunctioning and to control the life span of the public information display device, information related to the characteristics of the public information display device must be monitored.

In addition, since the public information display device operates for a long period of time, a flicker phenomenon frequently occurs due to variation of a non-adjustable common voltage VCOM.

SUMMARY OF THE INVENTION

The present invention provides a display system for allowing a user to easily monitor and control information related to a display. In one aspect of the present invention, a display system includes a display device and a remote controller having a keypad to communicates with the display device using RF transmission and generating codes corresponding to pressed keys. The display device includes a driver having the device information, and a communication circuit connected to the driver through a digital interface and operated in response to a command transmitted thereto from remote controller.

The communication circuit includes a processor connected to the driver through the digital interface, reading the device information from the driver through the digital interface in response to the command transmitted thereto from remote controller, and sending the adjusted device information to the driver as the adjusted device information is transmitted thereto from remote controller, and a transceiver making RF communication with remote controller according to a control of microcontroller.

The digital interface includes a serial digital interface. In detail, the digital interface includes a bidirectional $I^2C$ (inter integrated circuit) interface.

Remote controller includes an optical sensor that detects a flicker of the display device and a temperature sensor that detects a peripheral temperature. Optical sensor is attached to a rear surface of remote controller.

The display device includes a transceiver communicating with remote controller, and a network communication unit communicating with an external host through a communication network and transmitting control signals received from the external host to the image processing device.

According to this embodiment, remote controller includes a keypad including a plurality of keys and generating codes corresponding to pressed keys, a microcontroller generating a command to be transmitted to the display device from keypad, and displaying the device information obtained from the display device on a display panel.

BRIEF DESCRIPTION OF THE DRAWING

The above and other advantages of the present invention will become more apparent from a reading of the ensuing description together with the drawing, in which.

DESCRIPTION OF THE EMBODIMENTS

Figure 1:
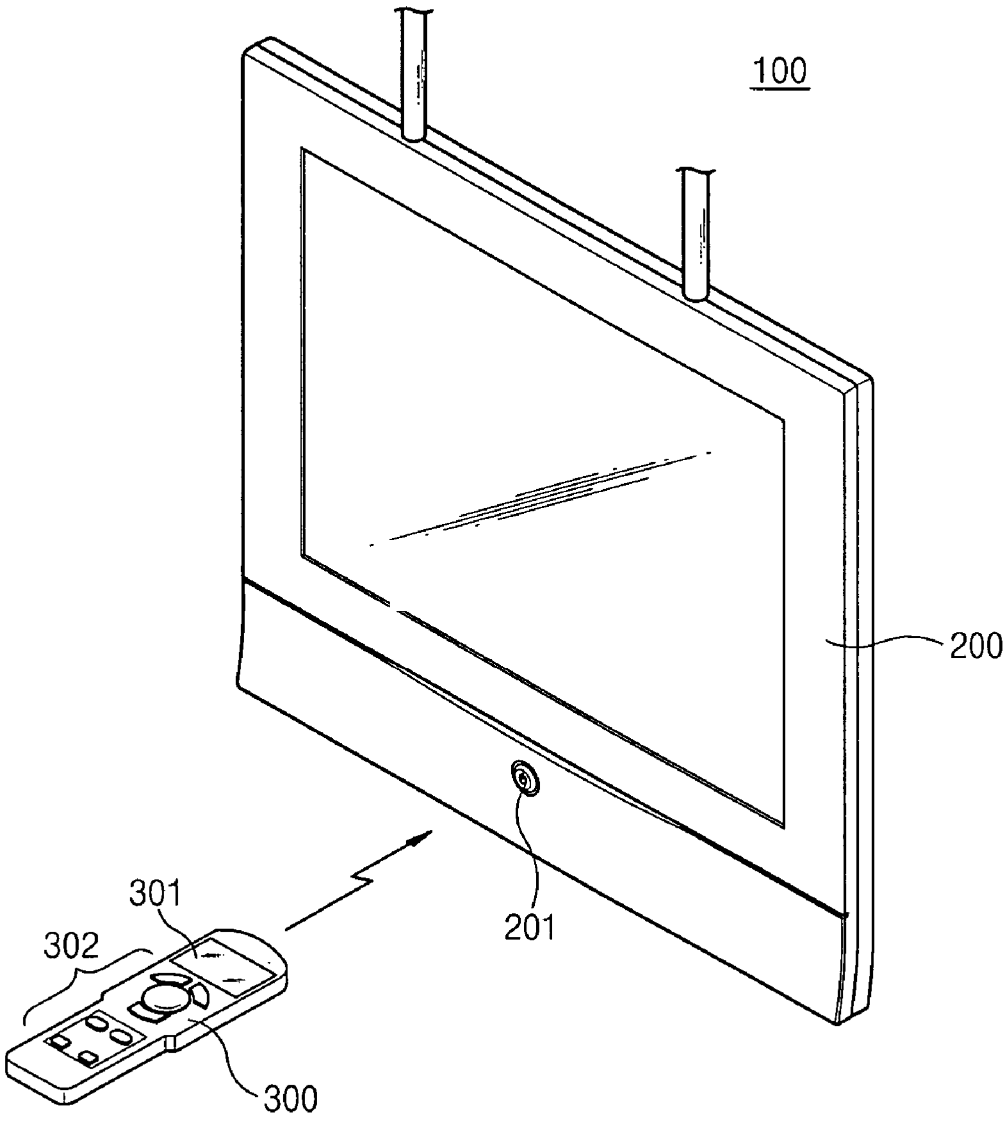
FIG. 1 is a perspective view showing an exemplary embodiment of a display system according to the present invention.

Hereinafter, embodiments the present invention will be explained in detail with reference to the accompanying drawings. FIG. 1 is a perspective view showing the structure of a display system according to an exemplary embodiment of the present invention.

Display system 100 includes a liquid crystal display device 200 and a remote controller 300. Display device 200 may be any of an OLED, an LCD, an FED, a VFD or a PDP. Display device 200 has a transceiving terminal 201 (or antenna) to enable communication with remote controller 300. The signal transmitted between display device 200 and remote controller 300 is an RF (radio frequency) signal. Display device 200 shown in FIG. 1 according to the exemplary embodiment of the present invention can be used as the PID apparatus.

Remote controller 300 includes a display panel 301 and a keypad 302 which are provided on the top surface of remote controller 300. A transceiving terminal or an antenna (not shown) is provided on one side of remote controller 300 so as to enable communication with display device 200.

Remote controller 300 makes RF communication with display device 200 in response to a code of a key pressed from among keys provided in keypad 302, thereby obtaining information from display device 200 and displaying the information on display panel 301. In addition, remote controller 300 adjusts the information of display device 200 and then sends the information to display device 200.

Display device 200 provides the information stored therein to remote controller 200 in response to the command received from remote controller 300, or stores the information adjusted by remote controller 300 in display device 200.

According to the display system 100 having the above structure of the present invention, the user can monitor or change the information of display device 200 by using remote controller 300 if the distance between display device 200 and remote controller 300 is within the range of RF communication.

Figure 2:
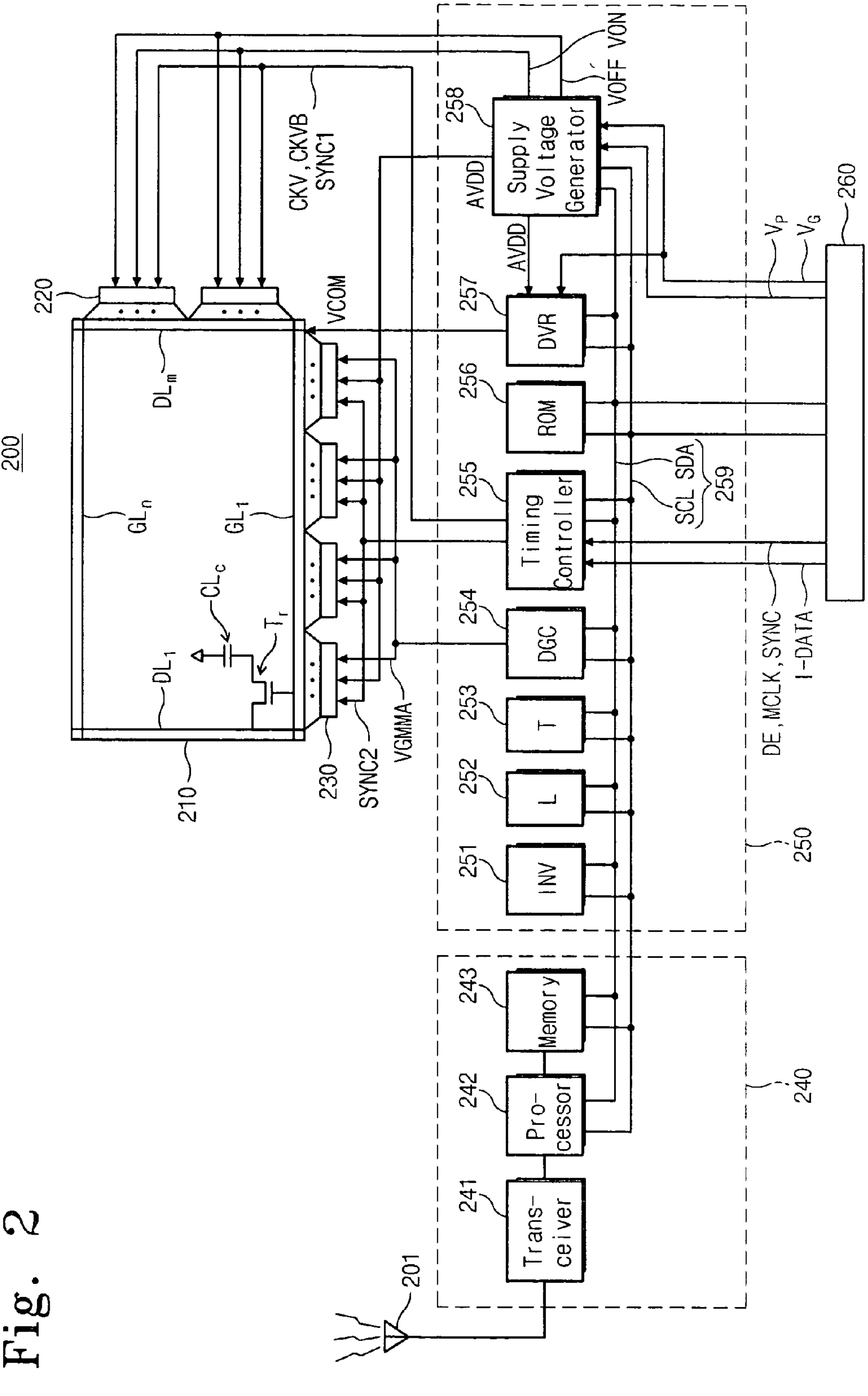
FIG. 2 is a block diagram illustrating an internal structure of a liquid crystal display device shown in FIG. 1.

FIG. 2 is a block diagram illustrating the internal structure of display device 200 constituting the display system 100 shown in FIG. 1. Referring to FIG. 2, display device 200 according to the exemplary embodiment of the present invention includes a liquid crystal panel 210, a gate driver 220, a data driver 230, a communication circuit 240, a controller 250 and an external interface 260.

A plurality of gate lines GL1 to GLn and data lines DL1 to DLm are provided on liquid crystal panel 110. In addition, a plurality of pixels, which are basic elements representing an image, are provided in pixel areas defined by the gate lines GL1 to GLn and data lines DL1 to DLm. Each of the pixels includes a thin film transistor Tr and a liquid crystal capacitor Clc. For instance, in the first pixel area, a gate electrode of thin film transistor Tr is connected to the first gate line GL1, the source electrode of thin film transistor Tr is connected to the first data line DL1 and a drain electrode of thin film transistor Tr is connected to one end of the liquid crystal capacitor Clc.

Gate driver 220 is prepared in the form of a chip and is electrically connected to gate lines GL1 to GLn. Gate driver 220 sequentially outputs gate signals to the gate lines GL1 to GLn in response to a first synchronous signal SYNC1, first and second clock signals CKV and CKVB, and first and second drive voltages VON and VOFF. In addition, data driver 230 is also prepared in the form of a chip and is electrically connected to data lines DL1 to DLm. The data driver 230 outputs data signals to the data lines DL1 to DLm in response to a second synchronous signal SYNC2, an analog gamma voltage VGMMA and a third drive voltage AVDD.

Controller 250 is connected to an external device (not shown) through the external interface 260. The external interface 260 converts the signals output from the external device into relevant signals for controller 250 and then sends the relevant signals to controller 250. Controller 250 includes an inverter controller 251, a brightness sensor 252, a temperature sensor 253, a gamma voltage generator 254, a timing controller 255, a non-volatile memory 256, a common voltage generator 257, a supply voltage generator 258 and an internal interface 259.

Internal interface 259 is a digital serial interface and the above devices of controller 250 (that is, the inverter controller 251, the brightness sensor 252, the temperature sensor 253, the gamma voltage generator 254, timing controller 255, the non-volatile memory 256, the common voltage generator 257, and the supply voltage generator 258) communicate with each other through internal interface 259.

Internal interface 259 includes an inter integrated circuit (hereinafter, referred to as $I^2C$) interface, which is one of digital serial interfaces. The $I^2C$ interface is a bidirectional 2-wire interface and includes a serial data line SDL for data communication and a serial clock line SCL, which controls and synchronizes data communication between the devices. The devices connected to the $I^2C$ interface are identified based on addresses dedicated to the devices, and each device can transmit or receive data. Data communication between the devices is achieved through a master-slave protocol scheme. The master initiates the data transmission and generates the clock signal. Remaining devices, other than the master, may serve as slaves which make data communication with the master.

For instance, in controller 250 according to the exemplary embodiment of the present invention, timing controller 255 serves as the master, and the non-volatile memory 256, the gamma voltage generator 254, the common voltage generator 257 and the supply voltage generator 258 serve as the slaves. The $I^2C$ interface may have a multi-master. In addition, a processor 242 provided in the communication circuit 240, which will be explained later, may serve as a master of internal interface 259.

Although internal interface 259 in the form of a 2-wire $I^2C$ interface is shown in FIG. 2, a 3-wire serial peripheral interface (SPI) can be used for internal interface 259. In this case, the 3-wire SPI includes a first serial data line for data transmission, a second serial data line for data reception, and a serial clock line which controls and synchronizes data communication between the devices.

Inverter controller 251 controls the operation of the inverter (not shown) providing a high voltage to a backlight unit (not shown). The brightness sensor 252 detects the brightness of an image displayed on the liquid crystal panel 210, and the temperature sensor 253 detects the peripheral temperature. In detail, the temperature sensor 263 detects the surface temperature of the liquid crystal panel 210 and the temperature of a substrate on which controller 250 is mounted.

Timing controller 255 is prepared in the form of a chip and receives image data I-DATA and external synchronous signals SYNC, MCLK and DE. Timing controller 255 stores the image data I-DATA in a frame memory (not shown) in a 1-frame unit and reads the image data I-DATA in a 1-line unit so as to send the image data I-DATA to the data driver 230. In addition, timing controller 255 outputs first and second synchronous signals SYNC1 and SYNC2 and first and second clock signals CKV and CKVB by converting the external synchronous signals SYNC, MCLK and DE.

For example, non-volatile memory 256 includes an EEPROM. Information related to the liquid crystal panel 210, that is, initial data including resolution of an image and a panel size, which are input through internal interface 259, are stored in the non-volatile memory 256. In addition, gamma data having gray scale values, which may vary depending on the average brightness of the image displayed on the liquid crystal panel 210, are also stored in the non-volatile memory 256. If the average brightness of the image is higher than the reference brightness, the gamma data have the gray scale higher than that of the reference gamma. In contrast, if the average brightness of the image is lower than the reference brightness, the gamma data have the gray scale lower than that of the reference gamma.

Timing controller 255 sends digital gamma data stored in the non-volatile memory 256 and the synchronous signal to the gamma voltage generator 254 through internal interface 259. The gamma voltage generator 254 converts the digital gamma data into analog gamma data VGMMA in response to the synchronous signal output from timing controller 255. The analog gamma data VGMMA, which are output from the gamma voltage generator 254, are transferred to the data driver 230.

Timing controller 255 generates drive voltage data based on data stored in the non-volatile memory 256 and then sends the drive voltage data and the synchronous signal to the supply voltage generator 258 through internal interface 259. The supply voltage generator 258 outputs first to third drive voltages VON, VOFF and AVDD and a logic voltage (not shown), which are suitable for the liquid crystal panel 210, by converting an external voltage Vp in response to the drive voltage data and the synchronous signal. Here, the logic voltage is necessary to drive the common voltage generator 257, timing controller 255 and the gamma voltage generator 254.

In addition, timing controller 255 generates common voltage data based on data stored in the non-volatile memory 256 and then sends the common voltage data and the synchronous signal to the common voltage generator 257 through internal interface 259. The common voltage generator 257 outputs the common voltage VCOM suitable for the liquid crystal panel 210 by converting the third drive voltage AVDD in response to the common voltage data and the synchronous signal.

Communication circuit 240 includes a transceiver 241, a processor 242 and a memory 243. Transceiver 241 converts an RF signal into a digital signal when it receives the RF signal from remote controller 300 through a transceiving terminal (or an antenna 201), and then sends the digital signal to processor 242. In addition, transceiver 241 converts the digital signal into the RF signal when it receives the digital signal from processor 242, and then sends the RF signal to remote controller 300 through the transceiving terminal 201.

Processor 242 is connected to devices provided in controller 250 through internal interface 259. Processor 242 sends information of display device 200 to remote controller 300 or changes information of devices provided in controller 250 in response to the command received from remote controller 300. In detail, processor 242 sends the information related to the devices of controller 250 (for example, brightness, temperature, common voltage, gray scale voltage, etc.) or data stored in the non-volatile memory 256 (for example, resolution, manufacturing number, total usage time, color parameter, response speed parameter, etc.) to remote controller 300. The memory 243 stores the process program executed by processor 242.

Figure 3:
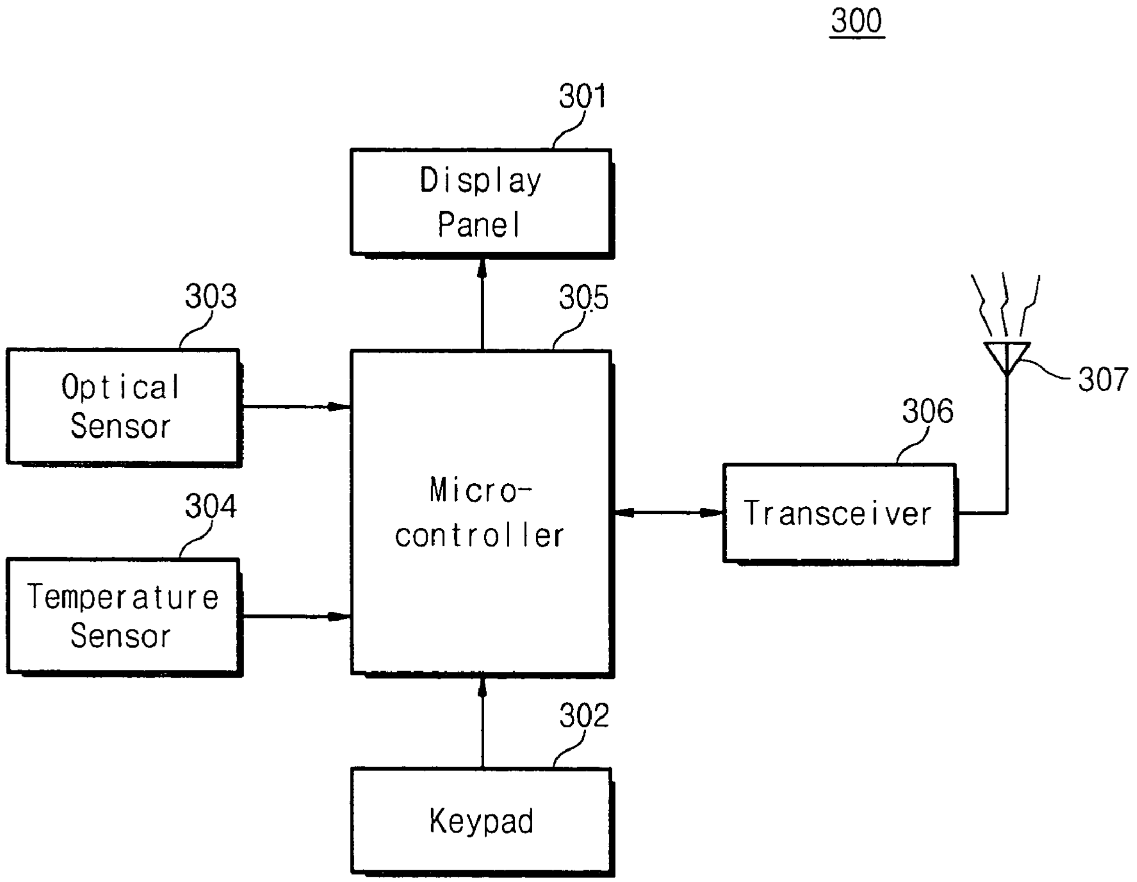
FIG. 3 is a block diagram illustrating an exemplary embodiment of a remote controller shown in FIG. 1 according to the present invention.

FIG. 3 is a block diagram illustrating an exemplary embodiment of remote controller 300 shown in FIG. 1 according to the present invention. Referring to FIG. 3, remote controller 300 includes display panel 301, keypad 302, an optical sensor 303, a temperature sensor 304, a microcontroller 305, a transceiver 306, and a transceiving terminal 307.

Display panel 301 includes the LCD or the OLED, which displays information of display device 200 and commands to be selected by the user under the control of microcontroller 305. Keypad 302 includes a plurality of keys and sends a code corresponding to a key selected by the user to microcontroller 305. If display panel 301 is prepared in the form of a touch screen panel, keypad 302 is not necessary. In this case, a code corresponding to a coordinate in the touch screen panel is transmitted to microcontroller 305 as the user touches the touch screen panel. Optical sensor 303 is used to detect the brightness of the liquid crystal panel 210 of display device 200. The temperature sensor 304 detects the peripheral temperature. If the user selects the temperature detection mode by using keypad 302, microcontroller 305 operates the temperature sensor 304. The temperature detected by the temperature sensor 304 is displayed on display panel 301 under the control of microcontroller 305. The user can adjust the characteristics of display device 200 based on the peripheral temperature displayed on display panel 301.

Remote controller 300 shown in FIG. 3 can further include various sensors in addition to optical sensor 303 and the temperature sensor 304 if they are necessary to monitor and adjust the characteristics of display device 200.

Transceiver 306 converts an RF signal into a digital signal when it receives the RF signal from display device 200 through the transceiving terminal 307, and then sends the digital signal to microcontroller 305. In addition, transceiver 306 converts the digital signal into the RF signal when it receives the digital signal from microcontroller 305, and then sends the RF signal to display device 200 through the transceiving terminal 307.

When remote controller 300 is powered on, a selection image is displayed on display panel 301. The selection image includes an operation mode to be selected by the user. For instance, the operation mode is classified into a monitoring mode and an adjusting mode. The monitoring mode includes a total usage time display mode and a common voltage/gamma voltage display mode. In addition, the adjusting mode includes a manual flicker adjusting mode and an automatic flicker adjusting mode.

The total usage time is stored in the non-volatile memory 256 of display device 200 and represents the total operating time of display device 200. The total usage time of display device 200 stored in the non-volatile memory 256 is displayed in the total usage time display mode.

The common voltage data of the common voltage generator 257 and the gamma voltage data of the gamma voltage generator 254 are displayed in the common voltage/gamma voltage display mode. According to the present embodiment, the common voltage generator 257 and the gamma voltage generator 254 have registers to store the common voltage data and the gamma voltage data, respectively. Processor 242 reads the common voltage data and the gamma voltage data from the common voltage generator 257 and the gamma voltage generator 254. As another exemplary embodiment of the present invention, processor 242 is designed such that processor 242 can read the common voltage data and the gamma voltage data from timing controller 255 in the common voltage/gamma voltage display mode.

The manual and automatic flicker adjusting modes are used to adjust the common voltage data of the common voltage generator 257 such that the flicker phenomenon caused by variation of the common voltage VCOM can be minimized.

The operation mode of remote controller 300 may further include modes used to monitor information related to various devices and the operational state of display device 200 and modes used to change information of various devices stored in the non-volatile memory 256.

Figure 4:
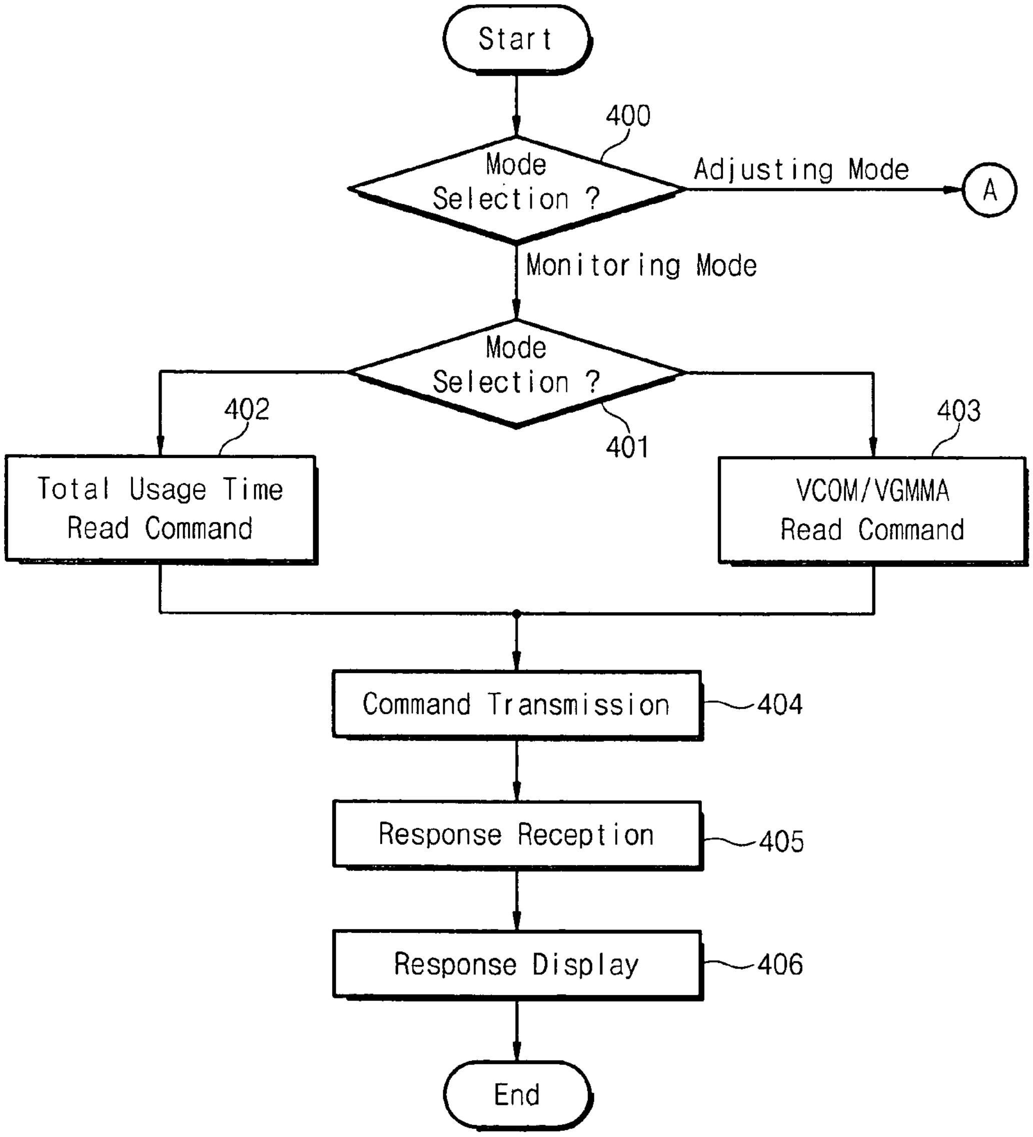
FIGS. 4 and 5 are flowcharts showing an operational procedure of a microcontroller installed in remote controller shown in FIG. 3.
Figure 5:
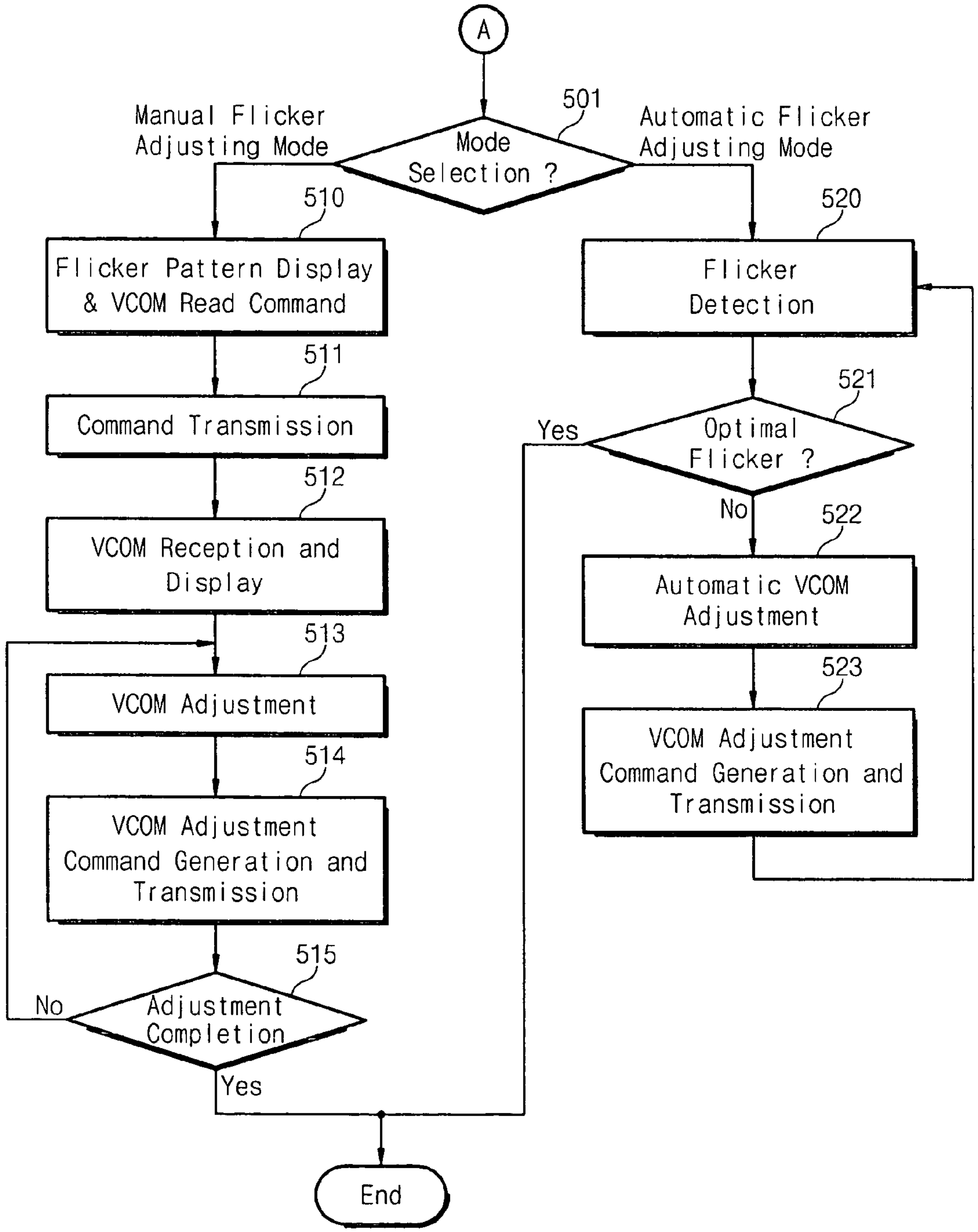
Figure 6:
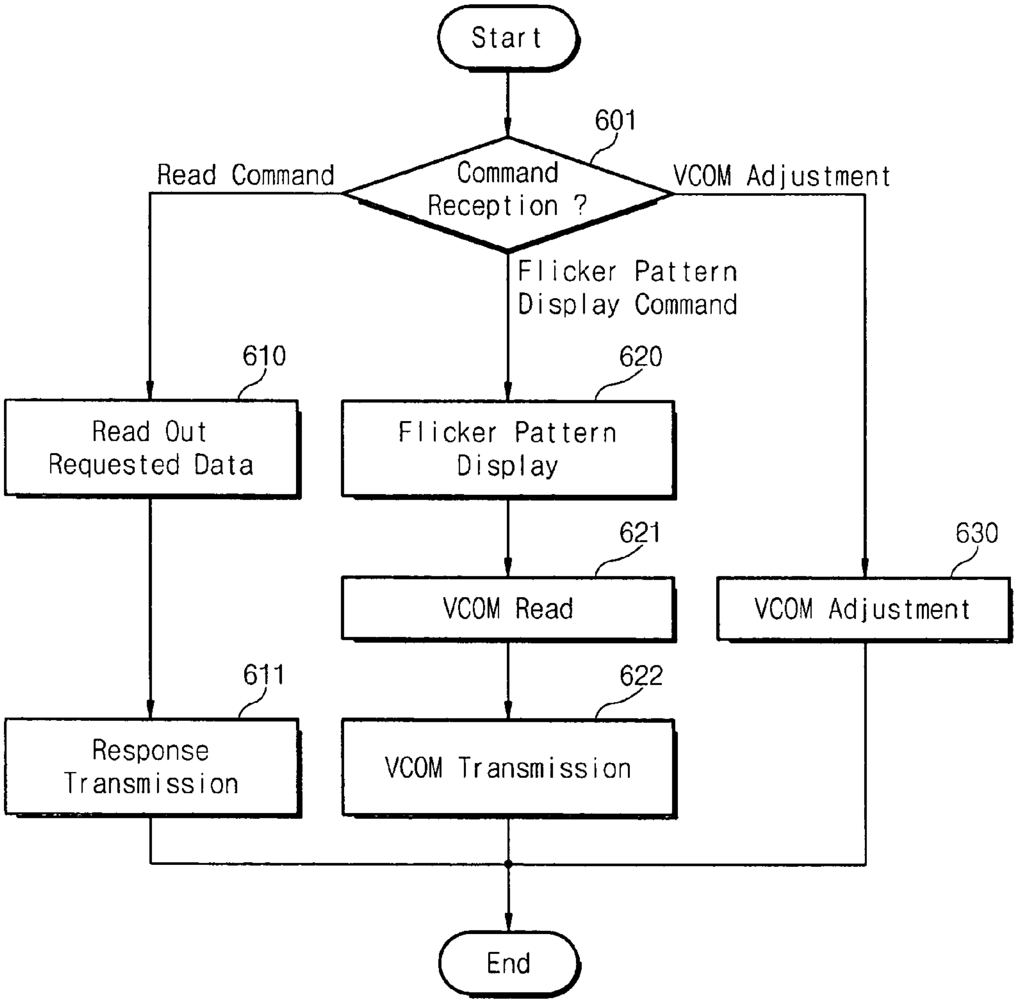
FIG. 6 is a flowchart showing an operational procedure of a processor installed in display device shown in FIG. 2.

FIGS. 4 and 5 are flowcharts showing the operational procedure of microcontroller 305 installed in remote controller 300 shown in FIG. 3, and FIG. 6 is a flowchart showing the operational procedure of processor 242 installed in display device 200 shown in FIG. 2. Referring to FIGS. 3 and 4, the user selects an operation mode in step 400. The selection of the operation mode is achieved when the user presses keypad 302 provided in remote controller 300. Microcontroller 305 determines the type of the operation mode selected by the user based on the code input into microcontroller 305 from keypad 302. If the monitoring mode is selected in step 400, step 401 is performed, and if the adjusting mode is selected in step 400, step 501 (see, FIG. 5) is performed.

For instance, if the monitoring mode is selected (step 400), the total usage time display mode or the common voltage/gamma voltage display mode is selected by the user (step 401). The code corresponding to the key pressed by the user is input into microcontroller 305. If the total usage time display mode is selected (step 401), microcontroller 305 microcontroller 305 generates a total usage time read command (step 402). In contrast, if the common voltage/gamma voltage display mode is selected (step 401), microcontroller 305 generates a common voltage/gamma voltage read command (step 403). Although FIG. 4 shows that the total usage time display mode and the common voltage/gamma voltage display mode are selected through two mode selection steps 400 and 401, the total usage time display mode and the common voltage/gamma voltage display mode can be selected by performing only one selection step.

The total usage time read command generated from microcontroller 305 is transmitted to display device 200 through the transceiving terminal 307 by means of transceiver 306 (step 404).

Referring to FIG. 6, if a received command is a read command (step 601), processor 242 of display device 200 obtains data requested by remote controller 300 from a corresponding device through internal interface 259. If the data requested by remote controller 300 is the total usage time, processor 242 reads out the total usage time from the non-volatile memory 256 through internal interface 259. In addition, if the data requested by remote controller 300 is the common voltage/gamma voltage, processor 242 reads out the common voltage data and the gamma voltage data from the common voltage generator 257 and the gamma voltage generator 254, respectively (step 610).

Processor 242 sends a signal to remote controller 300 through transceiver 211 and the transceiving terminal 201 in response to the command of remote controller 300 (step 611).

Referring again to FIG. 4, microcontroller 305 receives the response signal from display device 200 through the transceiving terminal 307 and transceiver 306 (step 405). If the command transmitted to display device 200 from remote controller 300 is the total usage time read command, the response signal transmitted from display device 200 is the total usage time. In addition, if the command transmitted to display device 200 from remote controller 300 is the common voltage/gamma voltage read command, the response signal transmitted from display device 200 is the common voltage/gamma voltage data.

Microcontroller 305 displays the response signal of display device 200 on display panel 301 (step 406).

The embodiment shown in FIG. 4 illustrates that the total usage time or the common voltage/gamma voltage data obtained from display device 200 are displayed on display panel 301 of remote controller 300. According to the method shown in FIG. 4, information related to the characteristics of display device 200, such as brightness, temperature, resolution, manufacturing number, total usage time, color parameter, or the response speed parameter, can be displayed on display panel 301 of remote controller 300.

FIG. 5 is a flowchart showing the control procedure of microcontroller 305 provided in remote controller 300 when the adjusting mode is selected (step 400) shown in FIG. 4.

The user selects the operation mode (step 501). The code corresponding to the key pressed by the user is input into microcontroller 305. If the manual flicker adjusting mode is selected (step 501), microcontroller 305 generates a command requesting flicker pattern display and common voltage read in response to the code from keypad 302. Here, the flicker pattern refers to a specific image pattern allowing the user to readily recognize the flicker phenomenon (step 510). In contrast, if the automatic flicker adjusting mode is selected (step 501), microcontroller 305 performs step 520.

In step 511, the command requesting flicker pattern display and common voltage read is transmitted to display device 200 through the transceiving terminal 307 by means of transceiver 306.

If processor 242 provided in display device 200 receives the command requesting flicker pattern display and common voltage read (step 601) shown in FIG. 6, processor 242 controls timing controller 255 so as to display the flicker pattern on the liquid crystal panel 210 (step 620). Thus, timing controller 255 controls gate driver 220 and the source driver 230 to display the flicker pattern stored in the memory (not shown) on the liquid crystal panel 210.

Processor 242 reads the common voltage data from the common voltage generator 257 (step 621), and processor 242 sends the common voltage data to remote controller 300 (step 622).

Referring again to FIG. 5, microcontroller 305 receives the common voltage data from display device 200 through the transceiving terminal 307 and transceiver 306 and then displays the received common voltage data on display panel 301 (step 512).

Microcontroller 305 receives a common voltage adjustment value from keypad 302 (step 513). That is, the user may input the common voltage adjustment value by using keypad 302 based on the flicker pattern displayed on the liquid crystal panel 210 of display device 200.

Microcontroller 305 transmits the adjusted common voltage data to display device 200 (step 514).

If the command received in processor 242 provided in display device 200 is the common voltage adjusting command, processor 242 performs step 630. In step 630, processor 242 sends the adjusted common voltage data to the common voltage generator 257 through internal interface 257. Thus, the flicker pattern is displayed on the liquid crystal panel 210 according to the adjusted common voltage data.

Referring again to FIG. 5, microcontroller 305 stops the control procedure when the code indicating completion of flicker adjustment is input into microcontroller 305 from keypad 302 in step 514. Otherwise, the control procedure returns to step 513 so that microcontroller 305 again receives the common voltage adjustment value.

Steps 510 to 515 show the method of controlling the flicker phenomenon by adjusting the common voltage VCOM based on the flicker pattern displayed on the liquid crystal panel 210 of display device 200.

As another method of controlling the flicker phenomenon, the common voltage data may be automatically inputted into microcontroller 305 in step 513. That is, microcontroller 305 sequentially changes the common voltage data whenever a predetermined time interval has lapsed and then sends the changed common voltage data to display device 200. As a result, the flicker pattern corresponding to the changed common voltage VCOM is displayed on the liquid crystal panel 210.

Accordingly, the user can stop the flicker adjustment by using keypad 302 when the flicker pattern displayed on the liquid crystal panel 210 is optimized. In step 51 5, microcontroller 305 stops the adjusting mode when the code corresponding to completion of the flicker adjustment is input into microcontroller 305.

Hereinafter, the control procedure of remote controller 300, which automatically detects the flicker phenomenon and adjusts the common voltage, will be described. If microcontroller 305 receives the code corresponding to the automatic flicker adjusting mode from keypad 302 (step 501), microcontroller 305 operates optical sensor 303 mounted on a rear surface of remote controller 300. Flicker information of the liquid crystal panel 210 detected by optical sensor 303 is input into microcontroller 305.

If the flicker of the liquid crystal panel 210 detected by optical sensor 303 is optimized (step 521), microcontroller 305 stops the automatic flicker adjusting mode. Otherwise, microcontroller 305 adjusts the common voltage data to a predetermined level corresponding to the detected flicker (step 522).

Then, microcontroller 305 sends the adjusted common voltage data to display device 200 (step 523) and then returns to step 520.

Referring to FIG. 6, if processor 241 of display device 200 receives the command requesting the common voltage adjustment (step 601), processor 241 sends the common voltage data, which have been received from remote controller 300, to the common voltage generator 257 through internal interface 259. Therefore, an image representing the flicker modified according to the adjusted common voltage VCOM is displayed on the liquid crystal display panel 210.

In step 520 of FIG. 5, flicker information of the liquid crystal panel 210 detected by optical sensor 303 is transmitted to microcontroller 305. If the flicker of the liquid crystal panel 210 is optimized (step 521), the automatic flicker adjusting mode ends.

Figure 7:
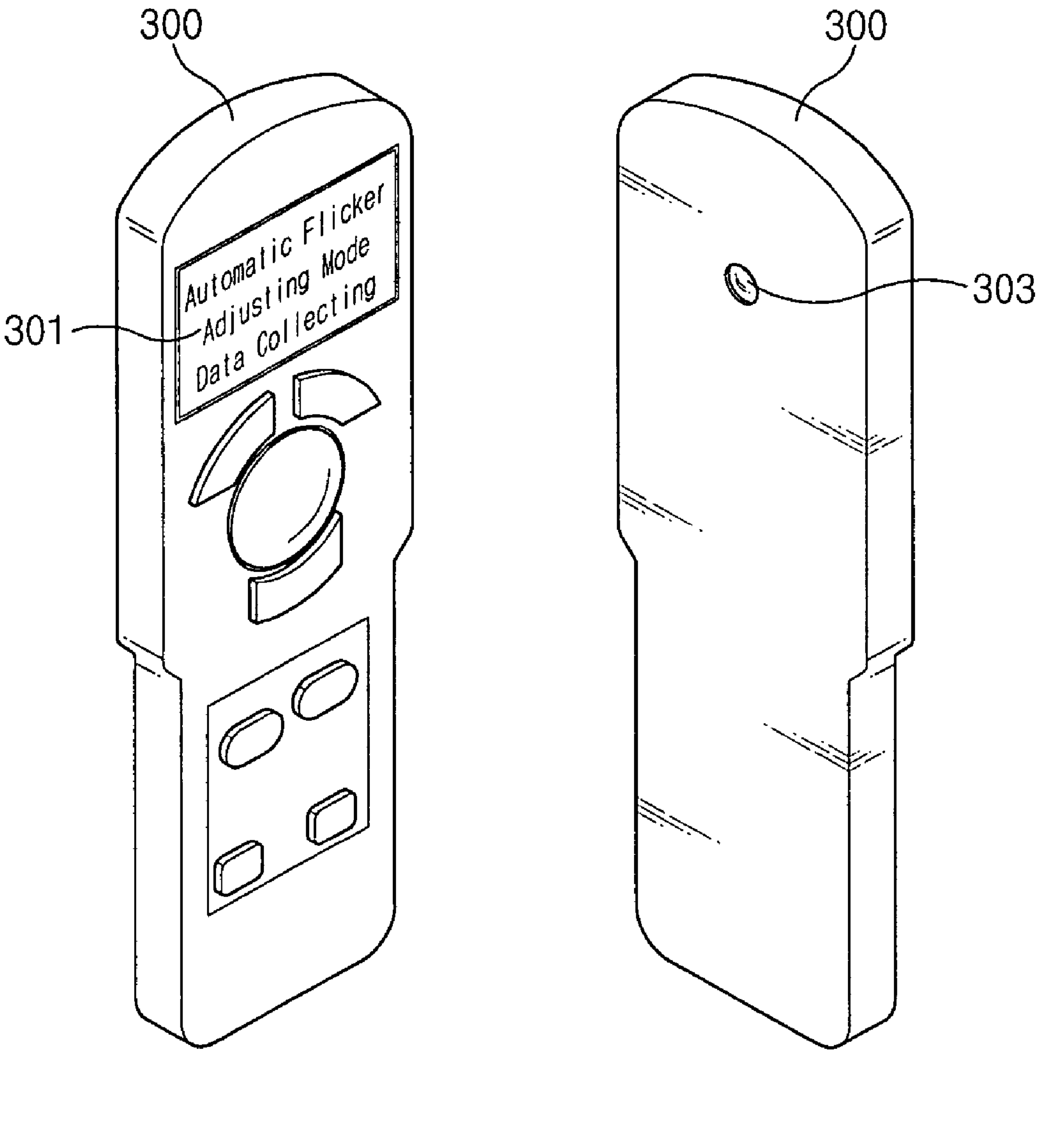
FIG. 7 is a perspective view showing an exemplary embodiment of an external structure of remote controller shown in FIG. 1 according to the present invention.

FIG. 7 is a perspective view showing an exemplary embodiment of an external structure of remote controller 300 shown in FIG. 1 according to the present invention.

Referring to FIG. 7, optical sensor 303 is attached to a rear surface of remote controller 300. Optical sensor 303 detects the flicker of the liquid crystal panel 210 of display device during the automatic flicker adjusting mode under the control of microcontroller 305. At this time, optical sensor 303 attached to the rear surface of remote controller 300 is positioned closer to the liquid crystal panel 210 in such a manner that optical sensor 303 can precisely detect the flicker of the liquid crystal panel 210. According to another embodiment of the present invention, a recess can be formed on a frame area of the liquid crystal panel 210 so as to receive remote controller 300, or a supporter is attached to the frame area of the liquid crystal panel 210 in order to mount remote controller 300 thereon. If remote controller 300 is received in the recess of the liquid crystal panel 210, or mounted on the supporter of the liquid crystal panel 210 during the automatic flicker adjusting mode, optical sensor 303 of remote controller 300 can be positioned closer to the liquid crystal panel 210.

Figure 8:
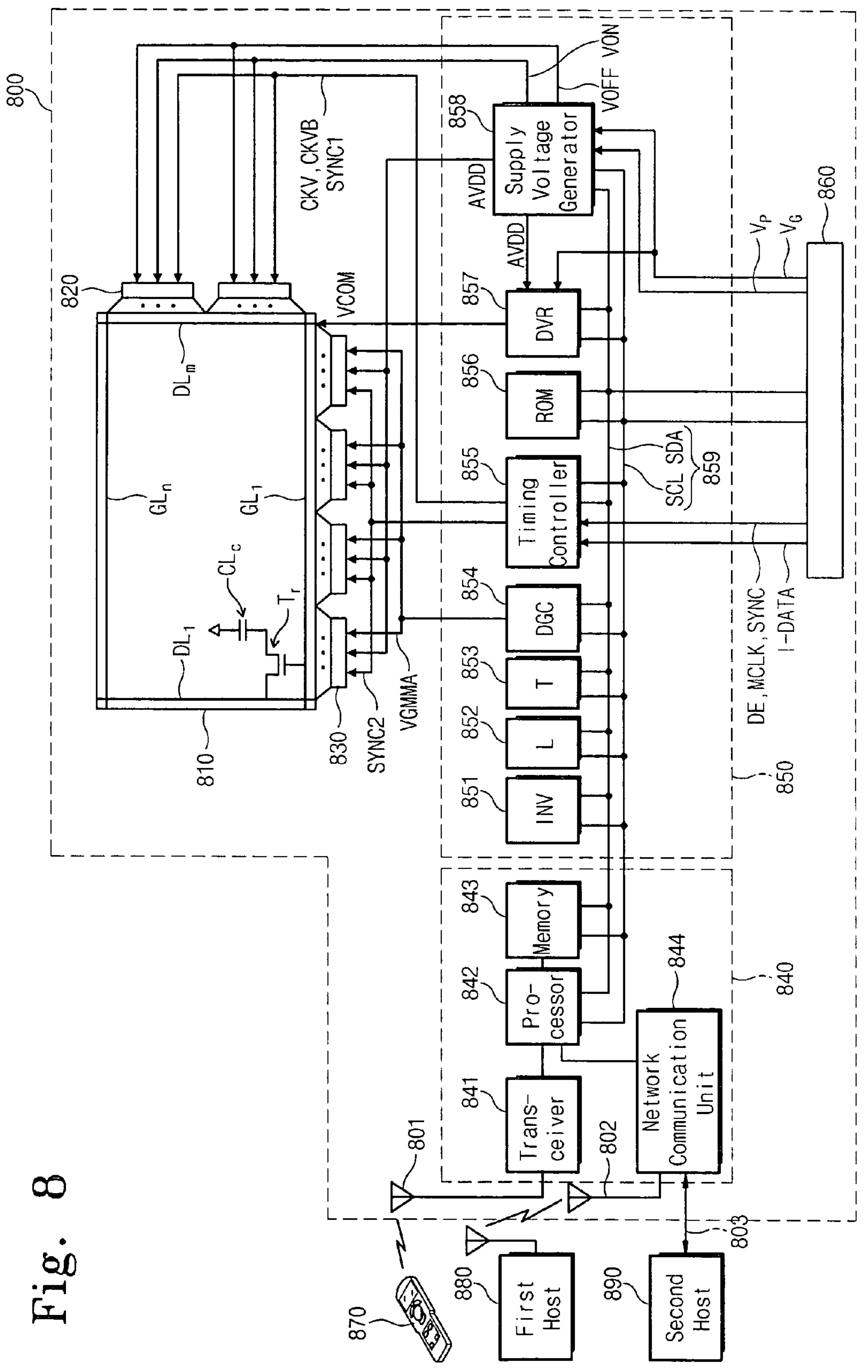
FIG. 8 is a block diagram showing another embodiment of an internal structure of a liquid crystal display device according to the present invention.

FIG. 8 is a block diagram showing another exemplary embodiment of the internal structure of a liquid crystal display device according to the present invention.

Display device 800 shown in FIG. 8 has the structure substantially identical to that of display device 200 shown in FIG. 2. However, the structure and operation of a communication circuit 840 of display device 800 are different from those of the communication circuit 240 of display device 200. The communication circuit 840 includes a transceiver 841, a processor 842, a memory 843 and a network communication unit 844.

Transceiver 841 converts an RF signal into a digital signal when it receives the RF signal from a remote controller 870 through an antenna 801, and then sends the digital signal to processor 842. In addition, transceiver 841 converts the digital signal into the RF signal when it receives the digital signal from processor 842, and then sends the RF signal to remote controller 870 through the antenna 801.

Network communication unit 844 communicates with a first host 880 through an antenna 802 and communicates with a second host 890 through a cabled communication channel 803. Network communication unit 844 may include both the antenna 802 and the cabled communication channel 803, or may include only one of the antenna 802 and the cabled communication channel 803. The first host 880 and/or the second host 890 receives information of display device 800, such as the manufacturing number, panel size, resolution, gamma value or brightness of display device 800, through network communication unit 844. In addition, the first host 880 and/or second host 890 sends information related to the characteristics of display device 800, such as the gamma value, brightness, or common voltage level, to a controller 850 through network communication unit 844.

In this manner, display device 800 shown in FIG. 8 can make communication with remote controller 870 as well as the first host 880 and/or second host 890 connected to display device 800 in a wired and/or wireless manner. Therefore, the user can readily monitor and adjust the characteristics of display device 800 by using the first host 880 and/or second host 890.

Figure 9:
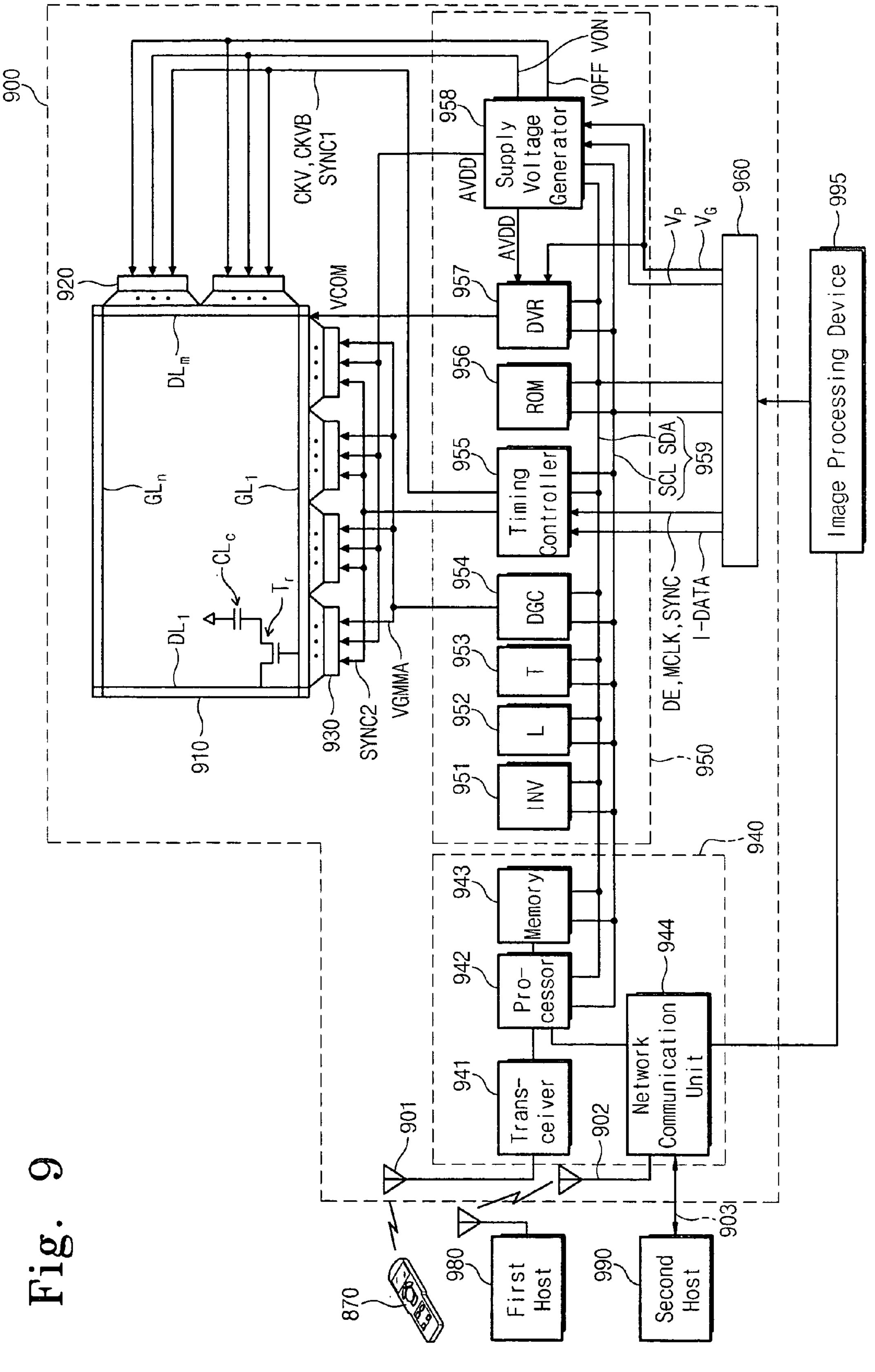
FIG. 9 is a block diagram showing another exemplary embodiment of a display system according to the present invention.

FIG. 9 is a block diagram showing another exemplary embodiment of the internal structure of a display system according to the present invention.

The liquid crystal display device 900 provided in the display system shown in FIG. 9 has the structure substantially the same as that of display device 800 shown in FIG. 8. Network communication unit 944 of a communication section 940 shown in FIG. 9 is connected not only to an external first host 980 and/or an external second host 990, but also to an image processing device 995. The image processing device 995 provides image data and driving signals to display device 900.

Network communication unit 944 communicates with the first host 980 through an antenna 92 and communicates with the second host 990 through a cabled communication channel 903. Network communication unit 944 may include both the antenna 902 and the cabled communication channel 903, or may include only one of the antenna 902 and the cabled communication channel 903. The first host 980 and/or the second host 990 receives information of display device 900 through network communication unit 944. In addition, the first host 980 and/or second host 990 sends information related to the characteristics of display device 900, such as the gamma value, brightness, or common voltage level, to a controller 950 through network communication unit 944.

Network communication unit 944 provided in display device 900 shown in FIG. 9 can make communication with the image processing device 995, so that the operational characteristics of the image processing device 995 can be changed according to the control signal transmitted from one of remote controller 970, the first host 980 and the second host 990.

In particular, if the second host 990 is connected to display device 900 through a communication network, such as an Internet, the user can monitor the status of display device 900 and can change the operational characteristics of display device 900 from a remote location, so that the consumer-support cost can be significantly reduced.

As mentioned above, the display system and the operation method thereof according to the present invention allow the user to readily monitor and adjust the characteristics of display device by using remote controller.

Although the exemplary embodiments of the present invention have been described, it is understood that various changes and modifications will be apparent to those skilled in the art without, however, departing from the spirit and scope of the invention.

What is claimed is:

1. A display system comprising:

a display device; and a remote controller making RF (radio frequency) communication with the display device;

wherein the display device comprises a driver having device data, and a communication circuit connected to the driver through a digital interface and operated in response to a command transmitted thereto from the remote controller;

wherein the remote controller comprises a keypad including a plurality of keys and generating codes corresponding to pressed keys, a microcontroller generating a command to be transmitted to the display device in response to the code generated from the keypad, and displaying on the a display panel the data obtained from the display device, and a transceiver making RF communication with the display device under control of the microcontroller, wherein if the command is a flicker pattern display command; the display device reads out a common voltage; transmits the common voltage to the remote controller, and the remote controller displays a flicker pattern.

2. The display system of claim 1, wherein the remote controller adjusts the device data obtained from the display device and transmits the adjusted device data to the display device.

3. The display system of claim 1, wherein the communication circuit comprises:

a processor connected to the driver through the digital interface, reading the device data from the driver through the digital interface in response to the command transmitted thereto from the remote controller, and sending the adjusted device data to the driver as the adjusted device data is transmitted thereto from the remote controller; and the transceiver making RF communication with the remote controller under control by the microcontroller.

4. The display system of claim 3, wherein the digital interface comprises a serial digital interface.

5. The display system of claim 4, wherein the digital interface comprises a bidirectional $I^2C$ (inter integrated circuit) interface.

6. The display system of claim 1, wherein the remote controller comprises an optical sensor that detects flickering of the display device.

7. The display system of claim 6, wherein the optical sensor is attached to a rear face of the remote controller.

8. The display system of claim 7, wherein the remote controller further comprises a temperature sensor that detects peripheral temperature.

9. The display system of claim 1, wherein the display device comprises a PID (public information display).

10. The display system of claim 1, wherein the device information comprises a resolution, a manufacturing number, a total usage time, a common voltage, a gamma value, the temperature, a color parameter, and a response speed parameter.

11. A method of operating a display system including a display device and a remote controller making RF communication with the display device, the operation method comprising:

transmitting a device information request command from the remote controller to the display device;

transmitting device information from the display device to the remote controller in response to the device information request command; and displaying the device information on a display panel of the remote controller, wherein, when transmitting a flicker pattern display command and a common voltage read command to the display device, the method further comprises:

displaying the common voltage received from the display device on the display panel.

12. The operation method of claim 11, further comprising:

transmitting an adjustment command from the remote controller to the display device so as to adjust the device information; and adjusting the device information of the display device in response to the adjustment command.

13. An method of operating a remote controller in a display system including the remote controller and a display device making RF communication with remote controller, the operation method comprising:

selecting an operation mode;

transmitting a command corresponding to the selected operation mode to the display device;

receiving a response from the display device; and displaying the response on a display panel of the remote controller, wherein, when the selected operation mode is a common voltage adjusting mode, the command transmitting comprises:

transmitting a flicker pattern display command and a common voltage read command to the display device, and the displaying further comprises:

displaying the common voltage received from the display device on the display panel.

14. The method of claim 13, wherein the operation mode comprises:

a monitoring mode during which the device information of the display device is monitored; and an adjusting mode during which the device information of the display device is adjusted.

15. The operation method of claim 13, wherein the device information comprises a resolution, a manufacturing number, a total usage time, a common voltage, a gamma value, a temperature, a color parameter, and a response speed parameter.

16. The operation method of claim 15, wherein the command transmitting comprises:

transmitting a device information read command to the display device when the selected operation mode directs to monitor one of device information.

17. The operation method of claim 15, further comprising:

inputting an adjustment value by using a keypad provided in the remote controller when the selected operation mode directs to adjust one of device information; and transmitting the adjustment value to the display device.

18. The operation method of claim 15, wherein, when the selected operation mode is a common voltage adjusting mode, the operation method further comprises:

adjusting the common voltage by using a keypad provided in the remote controller; and transmitting the adjusted common voltage to the display device.

19. The operation method of claim 15, wherein, when the selected operation mode is a common voltage adjusting mode, the operation method further comprises:

automatically adjusting the common voltage;

transmitting the adjusted common voltage to the display device; and determining whether a stop code is input from a keypad provided in remote controller, wherein the common voltage adjusting and common voltage transmitting are repeated if the stop code is not input from keypad provided in remote controller.

20. The operation method of claim 15, wherein, when the selected operation mode is a common voltage adjusting mode, the operation method further comprises:

detecting a flicker of the display device by using an optical sensor;

determining whether the flicker is in an optimal state;

adjusting the common voltage if the flicker is not in the optimal state; and transmitting the adjusted common voltage to the display device, wherein these processes are repeated until the flicker has been optimized.

21. An operation method of a display device in a display system including the display device and a remote controller making RF communication with the display device, the operation method comprising:

receiving a command from a remote controller; and controlling the display device corresponding to the command received from remote controller, wherein the controlling of the display device comprises:

displaying a flicker pattern if the received command is a flicker pattern display command;

reading out a common voltage; and transmitting the common voltage to the remote controller.

22. The operation method of claim 21, wherein the controlling of the display device comprises:

reading out device information corresponding to the command if the received command is a device information read command; and transmitting the device information to remote controller.

23. The operation method of claim 21, wherein the controlling of the display device comprises storing an adjustment value of the common voltage if the received command is a common voltage adjusting command.

* * * * *